United States Patent
Weiberle et al.

(10) Patent No.: US 7,395,303 B2
(45) Date of Patent: Jul. 1, 2008

(54) METHOD AND DEVICE FOR COMPARING BINARY DATA WORDS

(75) Inventors: Reinhard Weiberle, Vaihingen/Enz (DE); Thomas Kottke, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 666 days.

(21) Appl. No.: 10/824,286

(22) Filed: Apr. 13, 2004

(65) Prior Publication Data

US 2004/0267841 A1    Dec. 30, 2004

(30) Foreign Application Priority Data

Apr. 17, 2003    (DE) ................. 103 17 651

(51) Int. Cl.
    *G06F 7/50*    (2006.01)
(52) U.S. Cl. ................. 708/671; 340/146.2
(58) Field of Classification Search ........ 708/671; 340/146.2
    See application file for complete search history.

(56) References Cited

U.S. PATENT DOCUMENTS

| | | | | |
|---|---|---|---|---|
| 4,163,211 A | * | 7/1979 | Miura | 340/146.2 |
| 4,760,374 A | * | 7/1988 | Moller | 340/146.2 |
| 6,046,669 A | * | 4/2000 | Giamei et al. | 340/146.2 |
| 6,216,147 B1 | * | 4/2001 | Petro et al. | 708/671 |
| 2002/0083108 A1 | * | 6/2002 | Tierno | 708/671 |
| 2003/0023654 A1 | * | 1/2003 | Pascucci | 708/671 |
| 2003/0033342 A1 | * | 2/2003 | Griesemer | 708/670 |

* cited by examiner

*Primary Examiner*—Tan V. Mai
(74) *Attorney, Agent, or Firm*—Kenyon & Kenyon LLP

(57) ABSTRACT

A system and method for comparing binary data words are provided, which method includes splitting a first and a second data word (A, B) to be compared to one another into at least two subwords, one having high-order bits (hA, hB) and the other having low-order bits (nA, nB), and separately comparing each pair of the corresponding two subwords (hA, hB; nA, nB) in a separate comparing device. The intermediate comparison results of the comparing devices are gated in a logic device, e.g., an AND gate, to yield an overall result as a function of a control signal which is applied to a correction device, which is connected between at least one of the comparing devices and the logic device.

8 Claims, 1 Drawing Sheet

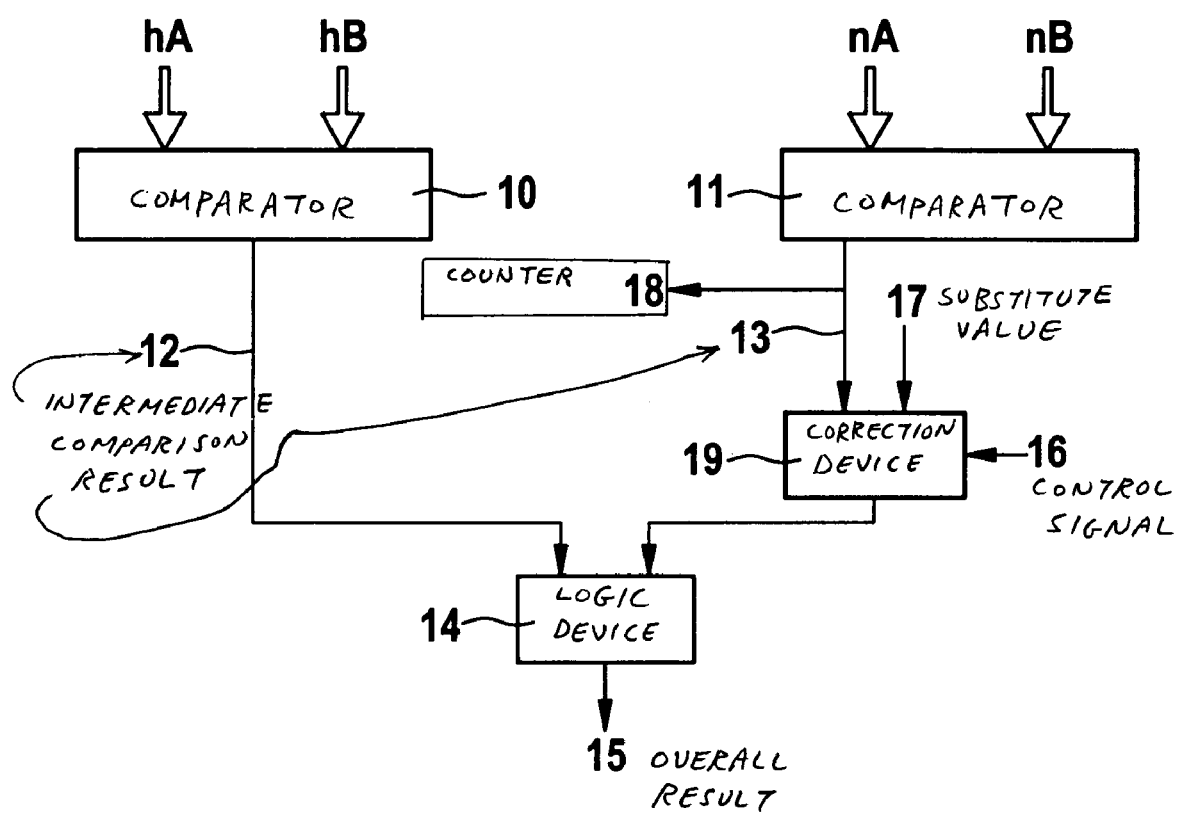

METHOD AND DEVICE FOR COMPARING BINARY DATA WORDS

FIELD OF THE INVENTION

The present invention relates to a method and a device for comparing binary data words, and particularly relates to a method and a device for comparing redundant data words using a microprocessor.

BACKGROUND INFORMATION

In safety-relevant systems, such as an ABS (anti-lock braking system) in a motor vehicle, malfunctions of the electronic components must be reliably detected, so redundancies are usually provided for fault detection, e.g., in the corresponding control devices for such safety-relevant systems. Thus, for example, in known ABS systems, the complete microcontroller is duplicated, and all ABS functions are redundantly computed and checked for agreement. If a discrepancy occurs in the results, the ABS system is switched off.

To reduce costs, conventional control systems utilize two CPUs (central processing units) which are implemented on one silicon chip, instead of using two complete microprocessors. In this case, all functions are likewise computed redundantly, and the respective output values are compared. Such a microcontroller is known as a dual-core computer. In a dual-core computer, the two sets of redundantly computed data are usually compared bit for bit. As a result, even in the event of a discrepancy between the lower-order data bits (e.g., least significant bits (LSB)), an error-specific system response, such as shutdown, occurs, although such an error in the lower-order data bits usually would not have a significant effect. An availability problem results, because the system is shut down even in the cases of errors for which a shutoff would not be necessary.

In today's systems, errors are generally handled irrespective of the relevance of the erroneous data. In other words, the same system response results irrespective of whether the fault has occurred in higher-order or lower-order bits, addresses, or data.

A comparable problem also occurs when using today's redundant communication systems, where messages of individual channels are usually provided with a checksum, e.g., CRC, coding and decoding taking place in a communication controller, rather than in the microcontroller itself which is the actual source or destination of the data.

SUMMARY

The method and the device for comparing binary data words according to the present invention have an advantage compared to the known approaches in that errors may be handled according to the particular situation as a function of the relevance of the data to be compared and of the significance of the erroneous bits. In other words, error "localization" as a function of the significance of the data, and consequently the possibility of situation-dependent error handling, are provided. This results in increased availability, for example, of a processor system, compared to known systems, because in the event of errors having little or no significant effects on the system, an error handling strategy that is different from the all-or-nothing strategy may be used.

Thus, according to the present invention, a method for comparing binary data words having the following steps is provided: splitting a first data word and a second data word to be compared to each other into at least one high-order-bit subword and one low-order-bit subword; separately comparing the corresponding subwords of the two data words, each comparison being performed by a separate comparing device; and gating the intermediate comparison results of the comparing devices in a logic device, e.g., an AND gate, to form an overall result as a function of a control signal that is applied to a correction device connected between at least one of the comparing devices and the logic device.

According to an example embodiment of the present invention, the data words are split in a microprocessor system in which redundant data words are checked for agreement. This has the advantage that redundant data words, split into subwords, may be compared in a microprocessor system as a function of their relevance.

According to a further example embodiment, a substitute result, instead of the intermediate comparison result of the comparing device for the low-value-bit subwords, is gated with the intermediate comparison result of the comparing device for the high-order-bit subwords as a function of the control signal and/or a negative intermediate comparison result. This has the advantage of providing a positive overall result, despite a discrepancy that occurred for the low-value bits when comparing the two data words. Therefore, no error strategy is initiated due to the positive overall result.

According to a further example embodiment, the control signal is formed by the control unit of a microprocessor, which generates the substitute value instead of the intermediate comparison result as a function of a destination address of the data words to be compared. A simple control option is thus provided for determining whether the substitute value is to be output instead of the intermediate comparison result.

According to a further example embodiment, the control signal is formed by the control unit of a microprocessor, which generates the substitute value instead of the intermediate comparison result as a function of instructions in the program code of the microprocessor. A control option for determining whether the substitute value is to be output instead of the intermediate comparison result is advantageously also provided in this case.

BRIEF DESCRIPTION OF THE DRAWING

FIG. 1 shows a schematic block diagram of an embodiment of a system for comparing data words according to the present invention.

DETAILED DESCRIPTION

FIG. 1 shows a schematic block diagram of an exemplary system for comparing data words according to the present invention. A first data word A is compared to a second data word B in the system shown in FIG. 1 in the following manner. Data word A is split into high-order-bit subword hA and low-order-bit subword nA, and data word B is split into high-order-bit subword hB and low-order-bit subword nB. High-value-bit subwords hA and hB of data words A and B, respectively, are compared in a first comparing device 10, e.g., a comparator, and low-value-bit subwords nA and nB of data words A and B, respectively, are compared in a second comparing device 11, e.g., a comparator.

On the side of FIG. 1 where the comparing device 11 is shown, either an intermediate comparison result 13 for low-order-bit subwords nA and nB, or a substitute value 17, e.g., a value of 1, is forwarded to logic device 14 on the basis of a control signal 16 sent, e.g., from a control unit of a microcontroller which executes a data word comparison, to a correction device 19. The correction device 19 receives as inputs the control signal 16, substitute value 17 and the intermediate comparison result 13, and output of the correction device is connected to logic device 14. Correction device 19 is a multiplexer, for example, and logic device 14 is formed by an AND gate, for example. It should be noted that intermediate comparison result 13 is also forwarded from the comparing device 11 to a counter 18, which detects whether the comparison result is positive, i.e., both subwords, e.g., nA and nB, agree bit for bit, or negative, i.e., the compared subwords do not agree bit for bit. If the intermediate comparison result 12 of the high-order-bit subwords comparison is positive, but the intermediate comparison result 13 of the low-order-bit subwords comparison is negative, i.e., there is a discrepancy between the low-order-bit regions of data word A and data word B, control signal 16 or correction device 19 renders it possible to relay a substitute value 17 instead of the negative comparison result 13 to logic device 14, thereby still outputting a positive overall result, so that no particular error procedure, such as shutdown, follows.

By splitting each data word A and B into a plurality of subwords, e.g., a high-order-bit subword and low-order-bit subword, and separately comparing the corresponding subwords of a given level (for example, high-order-bit subword hA of data word A with high-order-bit subword hB of data word B), it may be determined whether an error occurred in the high-order or low-order bits of a data word. Normally, each of the partial comparisons in comparing devices 10 and 11 must yield a positive result for the overall result to be deemed positive, i.e., valid. According to the present invention, this rule applies to primary data, i.e., important data, such as addresses or status data. However, for secondary data, i.e., less important data (such as reference variables, manipulated variables, or control variables), a deviation in the low-order bits would have no significant effect on the system response, but a deviation in the high-order bits would require error handling, i.e., an error-response strategy. Therefore, a negative intermediate comparison result 13 for the low-order bits of secondary data should not result in system shutdown in accordance with the present invention.

Using a control signal 16, the system according to the present invention provides an option of either utilizing only the partial result from the comparison of the high-order bits or utilizing both the partial result from the comparison of the high-order bits and the partial result from the comparison of the low-order bits for forming the overall result 15. In addition, in accordance with the present invention, information is provided as to whether the comparison of low-order bits nA and nB has yielded a positive result. The control signal 16 may be used for selecting between the intermediate comparison result 13 and substitute value 17, for forming overall result 15 as a function of the destination address of data words A and B to be compared. In doing so, certain registers for data which are to be compared bit for bit must be identified, using a program counter for address data, for example. As an alternative, the control signal 16 may be provided on the basis of additional instructions in the control program code. A programmer may establish which data are to be compared.

The use of the present invention in connection with redundantly received or redundantly computed data to be compared, for example, is applicable in all safety-relevant vehicle systems, such as ABS, ESP, steering and chassis regulation.

Although the present invention is described on the basis of an exemplary embodiment, it is not limited thereto, and the present invention encompasses alternative embodiments. For example, the data words to be compared may be split into more than two subwords. In addition, the relevance of the subwords to be compared may be determined in ways other than via low-order and high-order bits. In addition, the above-described elements, such as comparators, counters, AND gates, multiplexers, etc., are to be considered as examples only.

What is claimed is:

1. A method for comparing binary data words, comprising:
    splitting each of a first data word and a second data word into at least two subwords including one high-order-bit subword and one low-order-bit subword;
    comparing the high-order-bit subword of the first data word to the high-order-bit subword of the second data word in a first comparing device to produce a first intermediate comparison result;
    comparing the low-order-bit subword of the first data word to the low-order-bit subword of the second data word in a second comparing device to produce a second intermediate comparison result;
    applying a control signal to a correction device connected between at least one of the two comparing devices and a logic device; and
    gating the two intermediate comparison results in the logic device, depending on the control signal applied to the correction device, wherein an output of the logic device is provided as an overall result;
    wherein the overall result is usable for situation-dependent handling in a vehicle system.

2. The method as recited in claim 1, wherein the two data words are split in a microprocessor system that checks the two data words for agreement, and wherein the logic device is an AND gate.

3. The method as recited in claim 1, wherein a substitute value, instead of the second intermediate comparison result, is gated with the first intermediate comparison result, dependent on at least one of the control signal and a negative value of the second intermediate comparison result.

4. The method as recited in claim 3, wherein the control signal is formed by a control unit of a microprocessor, and wherein the substitution of the substitute value instead of the second intermediate comparison result is dependent on a destination address of the first and second data words to be compared.

5. The method as recited in claim 3, wherein the control signal is formed by a control unit of a microprocessor, and wherein the substitution of the substitute value instead of the second intermediate comparison result is dependent on instructions in the program code of the microprocessor.

6. A system for comparing binary data words, comprising:
    a device for splitting each of a first data word and a second data word into at least two subwords including one high-order-bit subword and one low-order-bit subword;
    a first comparing device for comparing the high-order-bit subword of the first data word to the high-order-bit subword of the second data word to produce a first intermediate comparison result;
    a second comparing device for comparing the low-order-bit subword of the first data word to the low-order-bit subword of the second data word to produce a second intermediate comparison result;
    a control device for generating a control signal;
    a logic device; and
    a correction device connected between at least one of the two comparing devices and the logic device, the correction device receiving the control signal;
    wherein the two intermediate comparison results are gated in the logic device, depending on the control signal applied to the correction device, wherein an output of the logic device is provided as an overall result;
    wherein the overall result is usable for situation-dependent handling in a vehicle system.

7. The system as recited in claim 6, wherein the device for splitting the first and second data words is included in a microprocessor system for checking redundant data words for agreement.

8. The system as recited in claim 6, wherein a substitute value, instead of the second intermediate comparison result, is gated with the first intermediate comparison result in the logic device, dependent on at least one of the control signal and a negative value of the second intermediate comparison result.

* * * * *